May 8, 1956     M. KIDDER     2,744,375
CORN HARVESTING PICKING ROLLS
Filed Jan. 30, 1952     7 Sheets-Sheet 1

*INVENTOR:-*
MAX KIDDER
BY:-
Spencer, Johnston, Cook & Root
ATTORNEYS

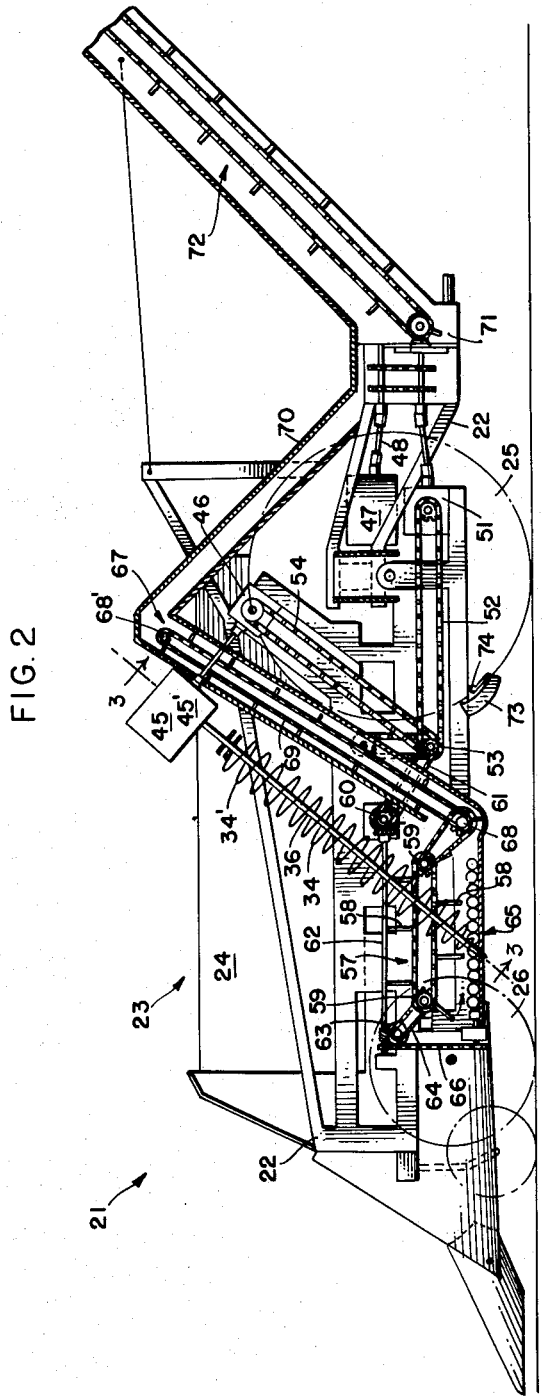

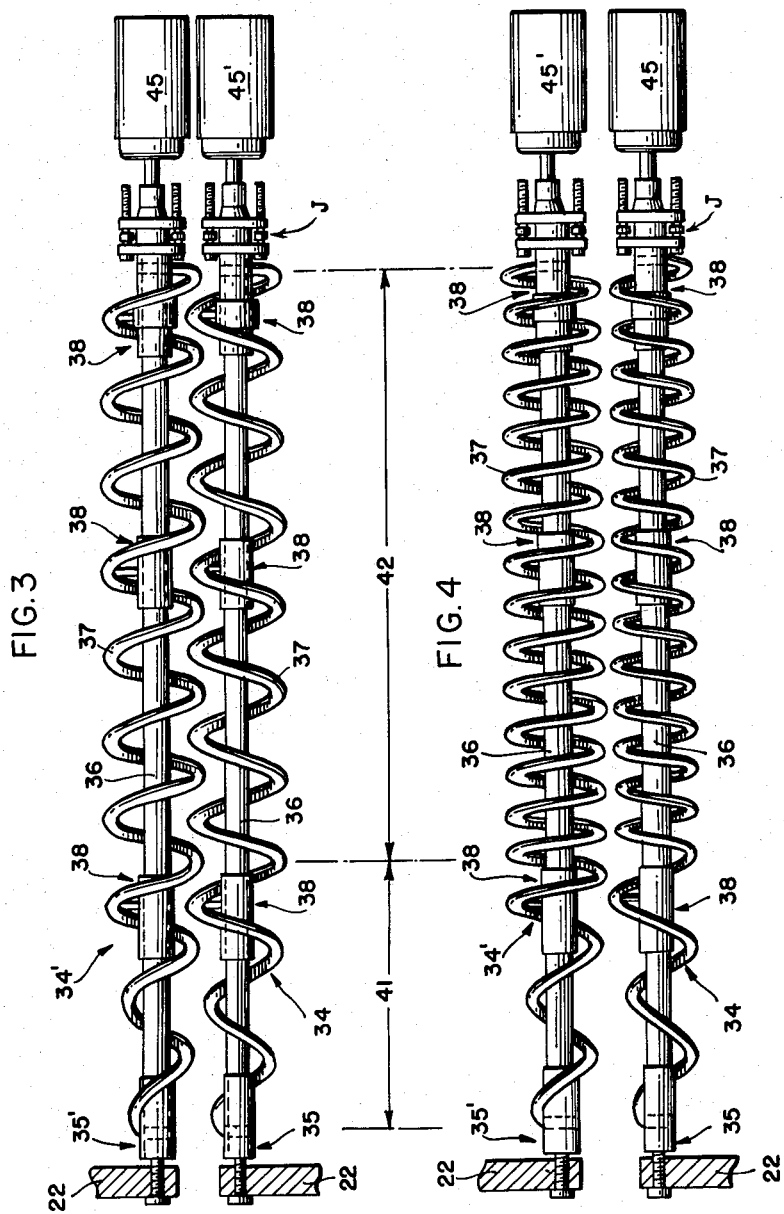

*INVENTOR:-*
MAX KIDDER
*BY:-*
Spencer, Johnston, Cook x Root
ATTORNEYS

May 8, 1956   M. KIDDER   2,744,375
CORN HARVESTING PICKING ROLLS
Filed Jan. 30, 1952   7 Sheets-Sheet 5

INVENTOR:-
MAX KIDDER
BY:-
Spencer, Johnston, Cook & Root
ATTORNEYS

May 8, 1956 M. KIDDER 2,744,375
CORN HARVESTING PICKING ROLLS
Filed Jan. 30, 1952 7 Sheets-Sheet 6
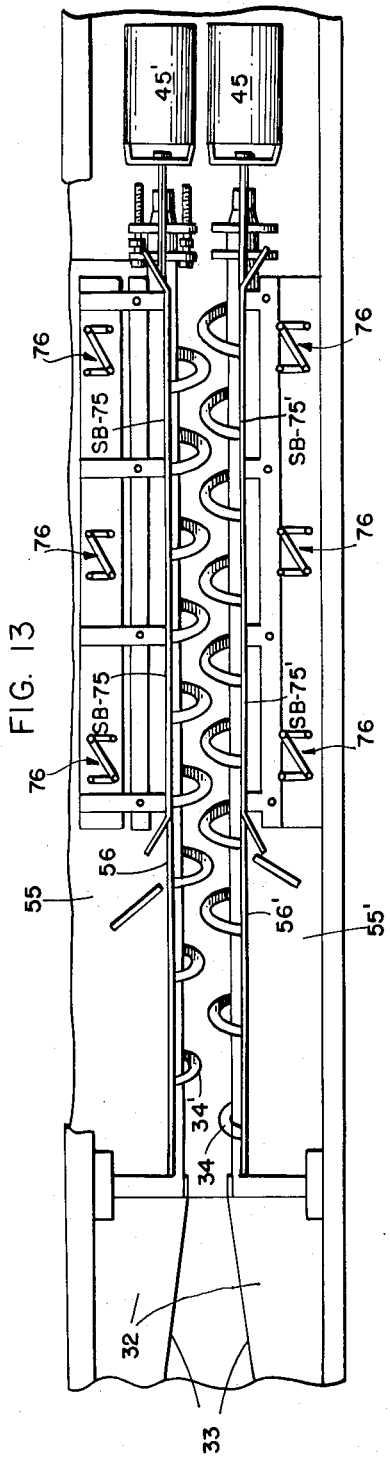
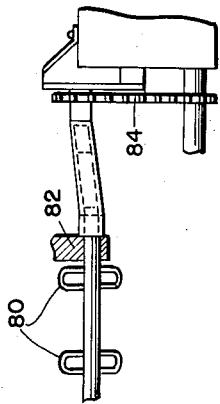
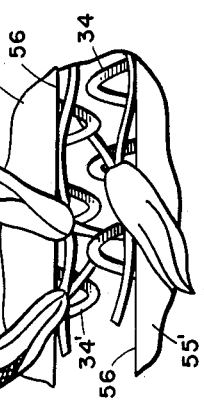
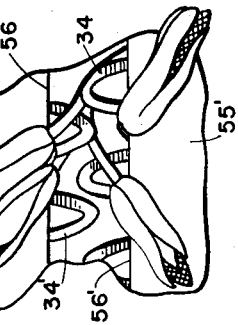
*INVENTOR:-*
MAX KIDDER
*BY:-*
Spencer, Johnston, Cook & Root
ATTORNEYS May 8, 1956  M. KIDDER  2,744,375
CORN HARVESTING PICKING ROLLS
Filed Jan. 30, 1952  7 Sheets-Sheet 7
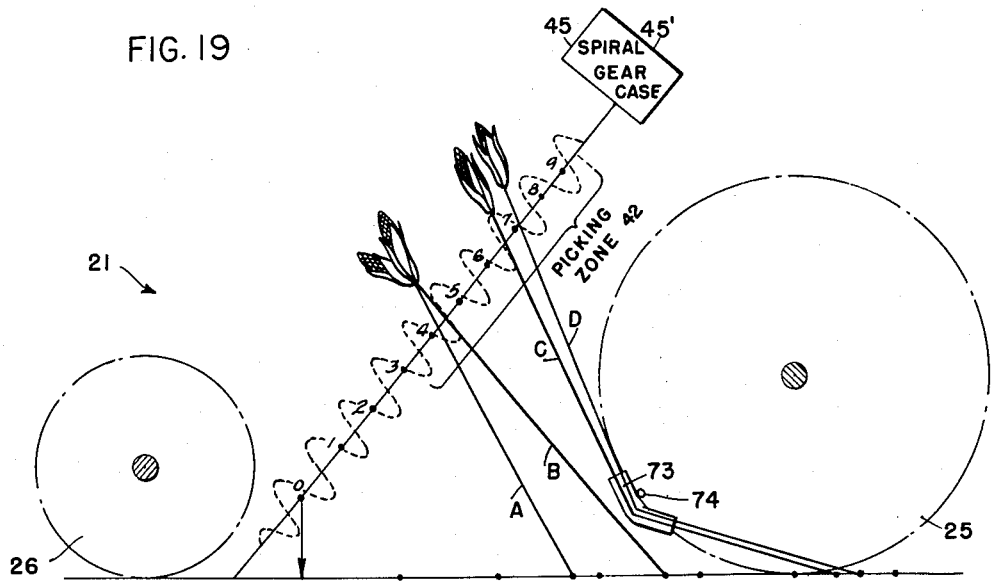
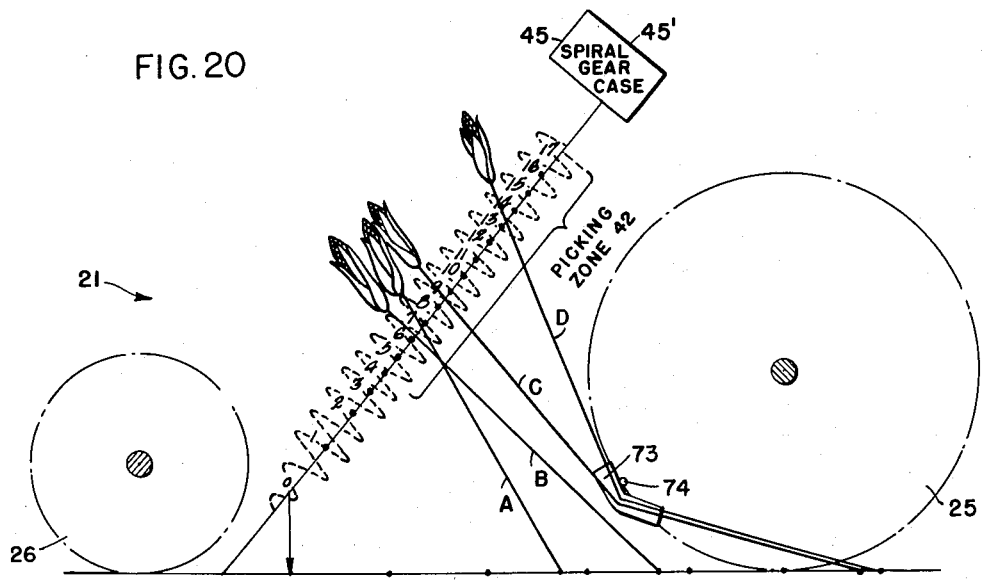
*INVENTOR:-*
MAX KIDDER
BY:-
Spencer, Johnston, Cook × Root
ATTORNEYS United States Patent Office 2,744,375
Patented May 8, 1956

2,744,375

CORN HARVESTING PICKING ROLLS

Max Kidder, Monmouth, Ill.; Maude F. Kidder, administratrix of said Max Kidder, deceased Application January 30, 1952, Serial No. 269,090

8 Claims. (Cl. 56—104)

The present invention relates in general to corn harvesting apparatus, and has more particular reference to equipment operable to remove ears of corn from corn stalks standing in situ in a corn field.

An important object of the invention is to provide, in a corn harvesting apparatus, improved picking elements for removing or snapping ears of corn from standing stalks carrying the same in the corn field, as the harvesting apparatus is moved along a standing row of stalks; a further object being to provide picker elements operable to remove ears of corn from standing stalks with equal effectiveness regardless of the elevation above ground level at which the ears may be carried on the stalks.

Another important object is to provide improved corn picking elements comprising helical members turnably mounted each on a corresponding shaft, each member being carried in position encircling and spaced outwardly of its carrying shaft; a further object being to employ a cooperating pair of such shaft mounted helical elements in closely adjacent relationship for corn picking purposes, whereby rotation of the helical elements will draw corn stalks therebetween into ear picking position.

Another object resides in the employment of a pair of rotating helical elements mounted in closely adjacent, or in intermeshing relationship, whereby corn stalks entering therebetween may be drawn or driven in positive fashion longitudinally of the helical elements at a calculated rate, with reference to the forward movement of the apparatus, along the row of corn stalks being picked, such that all ears of corn, regardless of the elevation above ground level at which the ears are carried on the stalks, will be subjected to the picking action of the helical elements, within a delimited picking portion or zone thereof, whence the picked ears may be delivered to husking apparatus or to any desired receiver.

Another important object is to turn the helical elements, comprising a corn picking pair of such elements, mutually in opposite directions so that the elements progressively move mutually inwardly toward a corn stalk therebetween, thence upwardly along the stalk, and finally outwardly thereof, whereby to remove ears of corn from the ear carrying stalks by upward action of the helical elements upon the ears of corn when the ear carrying stalk reaches picking position between the helical elements; a further object being to accomplish the removal of an ear of corn from its carrying stalk as the result of the abrasive and thrust action of the upwardly and outwardly rotating helical elements against the butt of the ear being removed, in combination with the pulling action exerted on the attached ear by the rooted stalk caused by the forward movement of the harvesting machine during the picking operation.

Another important object is to employ helical picking elements in which the helical pitch varies lengthwise of the elements; a further object being to employ helical elements of steep pitch at the leading or stalk entering end thereof, the element having a relatively shallow pitch in the picking zone.

Another important object is to configurate the several turns of the helical elements in non-circular or cornered fashion, providing spaced elbow corners at intervals along the helical elements, especially in the ear picking zones thereof, to thereby improve the picking operation by providing for bumping the ears through the action of the corner elbows of the turning helix on the ears.

Another important object is to provide, in a corn harvesting machine of the character mentioned, ear bumping mechanism comprising rotating arms or paddles disposed in the picking zone, in position to deliver lateral bumps or kicks upon ears of corn in the picking zone, to thereby aid in detaching the same from the corn carrying stalks.

Another important object is to provide a structure forming a picking throat at and along the picking zone, the throat comprising a pair of spaced members supported in position immediately above the helical picking elements, in the picking zone; a further object being to provide for adjusting the spaced throat forming members mutually toward and away from each other in order to adjust the width of the throat; a further object being to employ flexible throat forming members and means to contort the same laterally in adjustable fashion, whereby to permit the throat to be configurated selectively in various desired shapes, including a straight-sided throat, a serpentine throat, and a throat having successive relatively wide and relatively narrow portions throughout its length.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

Fig. 2 is a sectional view taken substantially along the line 2—2 in Fig. 1;

Fig. 3 is an enlarged sectional view taken substantially along the line 3—3 in Fig. 2;

Fig. 4 is a sectional view, like Fig. 3, showing a modified arrangement;

Fig. 13 is a top view of the apparatus shown in Fig. 12;

Figs. 15 and 16 are fragmentary views illustrating the manner in which ears of corn are picked in apparatus of the sort shown in Figs. 13 and 14;

Fig. 18A is a sectional view taken substantially along the line 18A—18A in Fig. 18; and Figs. 19 and 20 are diagrammatic views illustrating the manner in which corn stalk supported ears are delivered to the picking zone of the apparatus, in accordance with the present invention.

Figure 1:
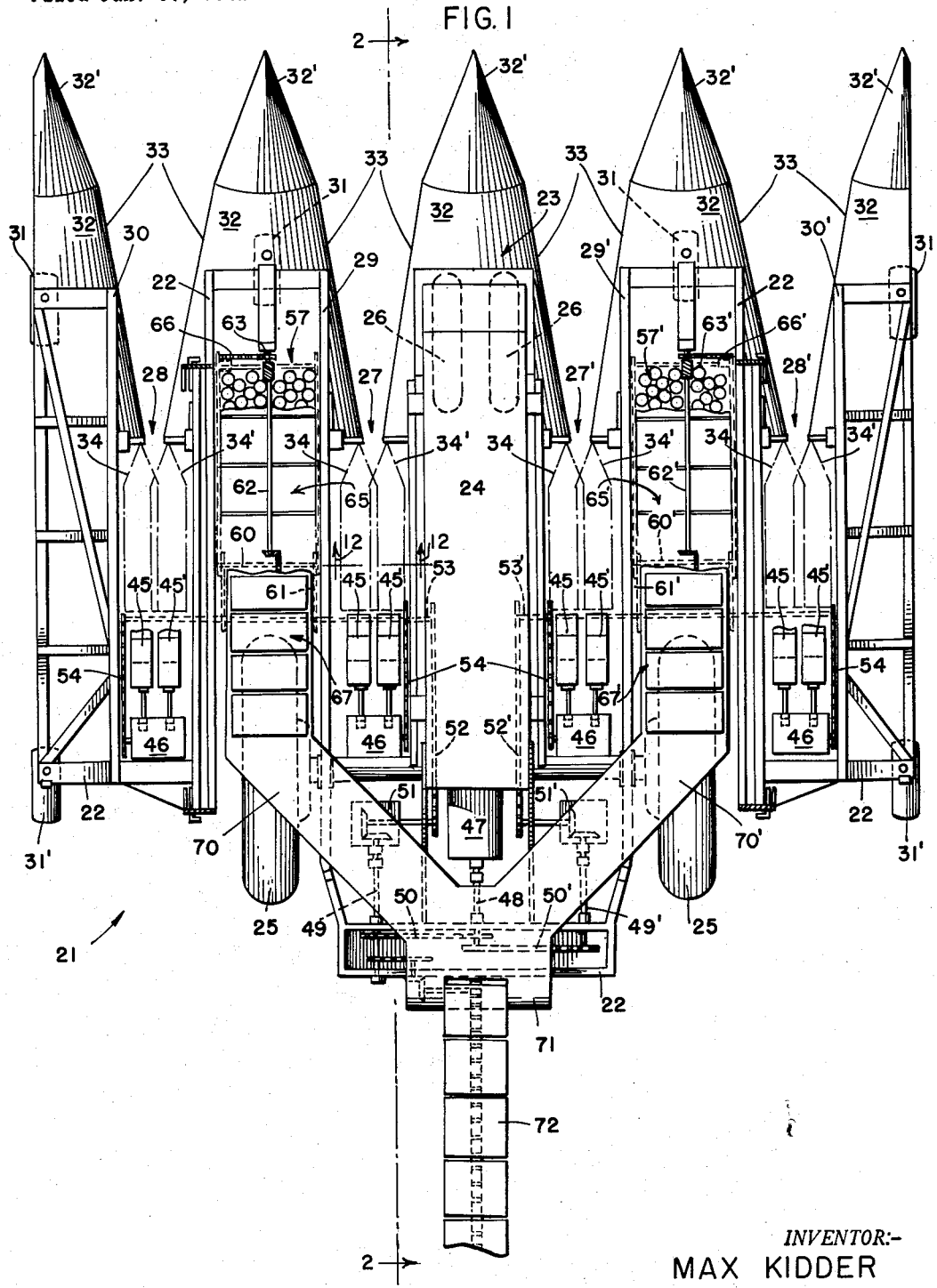
Fig. 1 is a top plan view, partially sectionalized, of corn harvesting apparatus embodying the present invention.
Figure 5:
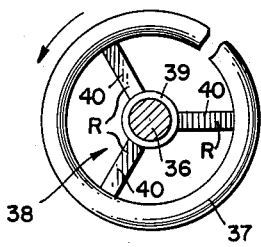
Figs. 5, 6 and 7 are enlarged sectional views illustrating several modes of mounting helical corn picking elements on their supporting shafts.

To illustrate the invention, the drawings show a corn harvesting device 21 comprising a frame structure 22 of any suitable or preferred configuration. This frame structure is adapted to be supported on suitable carriage means, which may conveniently comprise a conventional tractor 23 having a frame 24 supported on driving wheels 25 and steering wheels 26. The frame structure 22 may be erected or secured upon the tractor frame 24 in any preferred or convenient fashion for the purpose of mounting the component parts of the harvester equipment in operating position; and the said harvesting equipment may comprise one or more units, each adapted to operate upon corresponding rows of corn stalks from which ears of corn are to be picked.

As shown, the harvester may comprise four picking units mounted in side-by-side position in the frame structure 22, there being a pair of inner units 27 and 27', respectively disposed on each of the opposite sides of the tractor 23, and a pair of outer units 28 and 28' mounted on the frame structure 22 outwardly of the inner units. The frame structure 22 may comprise inner sections 29 and 29', spaced outwardly of the tractor frame 24 and serving, with the tractor frame, to provide means for mounting and supporting the inner picking units 27 and 27'. The frame structure may also include outer sections 30 and 30' disposed outwardly of the inner sections and serving, with the inner sections, to provide means for mounting and supporting the outer picking units 28 and 28'. The leading and trailing ends of the inner and outer sections of the frame structure may be supported on caster wheels 31 and 31'.

Preferably sheet metal means is mounted upon the front or leading portions of the tractor frame 24 and of the inner and outer sections of the frame structure, in order to provide inclined shields 32 forming converging throats 33 leading to the forward ends of the picking units, the shields being adapted to guide ear bearing corn stalks to the picking units as the equipment travels along stalk rows, the forward ends of the shields being formed as snouts 32' adapted to penetrate between rows of corn stalks during the picking operation.

The picking units 27, 27', 28 and 28' preferably are of substantially identical construction, except that the units 27, 28 and 27', 28', respectively, comprise matching left and right hand units. Each picking unit comprises a pair of cooperating helical members or rolls 34 and 34' suitably journaled in bearings 35 and 35' in the frame structure 22, and means is provided for turning the helical members 34 and 34' about their axes in opposite directions. In this connection, the members 34 and 34' are mounted in the harvesting structure with their axes in spaced apart, parallel relationship, said axes extending in vertical planes parallel to the direction of forward movement of the apparatus. The rotary axes of the members 34 and 34' are also disposed, as shown in the drawings, at an angle of the order of 45° with respect to horizontal, so that the helical members are inclined upwardly and rearwardly of the forward ends thereof, which are disposed in the structure at a preferred elevation above ground level of the order of nine inches more or less, said lower and forward ends of the helical members 34 and 34' of each picking unit being mounted at the inner end of a corresponding throat 33. The lower and forward ends of said members 34 and 34' may be raised, and the upper and rearward ends of said members, including the gear cases 45 and 45', may be lowered by adjustments in the frame 22, whereby the angle of the rotary axes of the members 34 and 34', with respect to the horizontal may be less than the approximate 45° inclination shown in the drawings.

Figure 6:
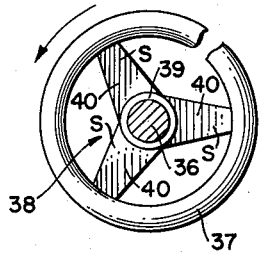
Figure 7:
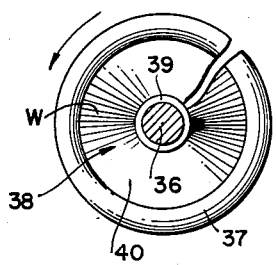

As shown more particularly in Fig. 3 of the drawings, the members or rolls 34 and 34' each comprise a preferably tubular steel shaft 36 and a preferably steel rod 37 forming an element of generally helical configuration supported preferably rigidly on the shaft for turning movement therewith about the axis of the shaft. The helical element 37 comprises helical turns encircling and spaced outwardly of the shaft, and supported thereon at intervals, as by means of mounting members 38. The mounting members may each comprise a sleeve 39 adapted to embrace and snugly fit upon the shaft 36 in slidable fashion, the sleeve 39 being preferably splined on the shaft for rotation therewith. The sleeves 39 of the mounting members may carry radially extending means 40 thereon for mounting and supporting the helical element. Such radially extending means 40 may comprise rods or bars R as shown in Figs. 5, 8, 9 and 10, strips S, as shown in Fig. 6, or a helically warped sheet or web W, as shown in Fig. 7. The rods, strips, or webs preferably comprise spring steel, and may be integrated with the sleeves 39 and the helical elements 37, as by welding. The opposite ends of the helical elements may be bent inwardly for attachment on mounting sleeves 39 on the shaft at the opposite ends thereof.

The helical elements 37, at the lower or leading ends of the members 34 and 34', are configurated to provide a relatively steep pitch, and the diameter of the helical element progressively increases in a direction away from the leading or lower end of the helical element to provide a stalk-receiving zone 41 of spiral-helical configuration upwardly and rearwardly from the leading or lower end of the helical members 34 and 34'. Upwardly and rearwardly of said spiral-helical zone, and from said zone to the upper and rearward end of the members 34 and 34', the helical element 37 is preferably configurated to provide turns of uniform pitch and diameter, the same comprising a picking zone 42 in the harvester.

Figure 8:
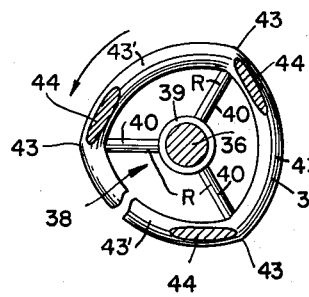
Figs. 8, 9 and 10 are enlarged sectional views illustrating various cornered shapes which may be incorporated in the several turns of the helical corn picking elements.
Figure 9:
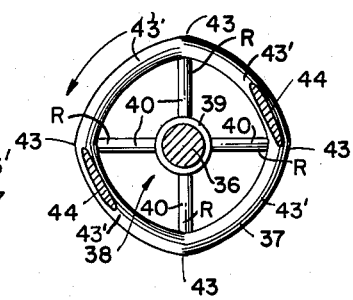
Figure 10:
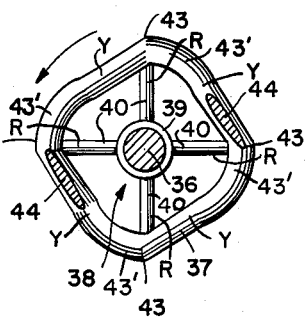
Figure 11:
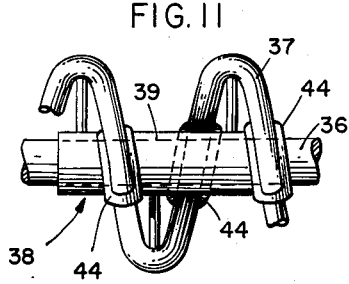
Fig. 11 is an enlarged sectional view illustrating lobes which may be applied at spaced intervals along the helical picking elements.

While the present invention contemplates and includes the formation of the helical elements 37 in continuous, uniform, helical configuration in the picking zone, with all portions of each helical element spaced uniformly from the axis of the shaft on which mounted, the successive turns of the helical elements, however, may be and preferably are discontinuously configurated, as shown more particularly in Figs. 8, 9 and 10. In that connection, each turn of the helical element 37 may be provided with corners or elbows 43, the portions 43' of the elements between the elbows being outwardly bowed. Any desired number of corners per turn of the helical element may, of course, be provided. Figs. 8 and 9 illustrate helical elements embodying three and four corners or elbows per turn, respectively. As shown in Fig. 10, the portions 43' of the helical element between successive corners or elbows 43 may be configurated to the shape of a flat, reverse S or cyma curve. The present invention also contemplates the provision of lobes 44 comprising lateral ribs or fins at intervals on the helical elements 37, said lobes, or fins or ribs comprising enlargements formed on the elements and located preferably at or closely adjacent the corners or elbows 43.

The helical member 34 and 34' of each picking unit may be of like size and configuration, as shown in Fig. 3, although it is within the contemplation of the present invention, as shown in Fig. 4, to provide elements 34 and 34' of unlike helical diameter. Preferably, the helical members 34 and 34' forming a picking unit are mounted in spaced relationship, such that the coils or turns of one helical element overlap and interfit with the coils or turns of the cooperating element, as shown more particularly in Fig. 3. It is, however, within the contemplation of the present invention to space the cooperating elements sufficiently so that the coils of one do not overlap or intermesh with the coils of the other, as shown more particularly in Fig. 4. The helical elements of each cooperating pair of members 34 and 34' are coiled in opposite directions, and means is provided for driving the members in opposite directions and in unison at such related speed that the coils or turns of the cooperating elements do not interfere.

In this connection, a geared driving mechanism 45 and 45' may be provided on the frame structure 22 for each of the members 34 and 34' of each picking unit. Each pair of geared driving mechanisms, in turn, may be driven in unison by a driving gear unit 46, the several units 46 being likewise appropriately mounted in the frame structure 22. The several driving gear units 46 may be driven by the power plant of the tractor 23 which, as shown, has a transmission 47 providing a power takeoff shaft 48. The shaft 48 may be drivingly connected with a pair of countershafts 49 and 49' in any suitable fashion, as by means of driving gears and chains 50 and 50'. The countershafts 49 and 49' may be drivingly connected through gearing means 51 and 51' and drive chains 52 and 52' with shafts journaled in the frame structure 22 on opposite sides of the tractor and beneath the upper and rearward ends of the picking units 27, 27', 28 and 28'; and the several driving gear units 46 may be drivingly connected with the shafts 53 and 53', as by means of driving chains 54.

The frame structure 22 is provided with inclined walls 55, 55' having spaced facing edges 56, 56' defining an elongated opening therebetween. A pair of these walls is disposed immediately above the members 34 and 34' of each picking unit, with the wall edges 56 and 56' extending, respectively, above and parallel with respect to the axes of rotation of the members 34 and 34'. The elongated openings defined by the spaced edges 56, 56' in each picking unit extend at and coincide with the picking areas of the units, so that ears of corn, after removal from the carrying stalks in the picking zone, may fall upon and be guided by the inclined walls to a receiving zone in the harvesting apparatus.

Any suitable or desired disposition may be made of picked ears of corn received in said receiving zone; and any suitable or preferred means may be provided for discharging ears of corn from the receiving zone. As shown, provision may be made for husking the ears in the receiving zone and for delivering husked ears from the harvesting apparatus to suitable receiving means, such as a wagon towingly connected with the harvester apparatus. To this end, the inclined walls 55 and 55' extend laterally outwardly of the associated members 34 and 34', and are inclined in such fashion that the walls associated with the inner picking units 27 and 27' are inclined mutually downwardly and outwardly of the tractor 23, while the walls associated with the outer picking units 28 and 28' are inclined downwardly and inwardly. Accordingly, all of the walls of the several units are inclined downwardly and inwardly toward the inner sections 29 and 29' of the frame structure 22, the same forming receiving zones for the picked ears. The inner frame structures may provide mountings for conveyors 57, 57'. These conveyors may conveniently comprise endless conveyor belts having transverse ribs 58, mounted thereon, the belts being supported on spaced wheels or rollers 59, 59' and driven from the shafts 53, 53'.

To this end, the shafts may be suitably connected with countershafts 60, 60', as by means of driving chains 61, 61'. The countershafts may be drivingly geared with shafts 62, 62' carrying worm gears journaled in and extending longitudinally of the sections 29 and 29' of the frame structure, said form gears being drivingly connected with worm wheels 63, 63' on conveyor driving shafts journaled in said frame sections 29 and 29', in position extending transversely thereof and drivingly connected, as by means of chains 64, with the belt supporting and driving rollers 59 and 59'.

The conveyors 57, 57', of course, are disposed in position to receive ears of corn harvested from the supporting corn stalks in the picking zones and delivered thence over the inclined walls 55, 55' into the receiving zone. The conveyors may be arranged to deliver the picked ears of corn to any desired delivery or discharge position in the harvesting apparatus. As shown, however, the conveyors are arranged to deliver the picked ears to the inlet end of the husking beds 65, 65', comprising husking apparatus mounted in position extending lengthwise of the frame sections 29, 29', and all drivingly connected, as by means of driving chains 66, 66', with the shafts 62, 62'. The huskings beds may be arranged to deliver husked ears to the lower or receiving end of preferably inclined elevators 67, 67', the same preferably comprising an endless belt carried on upper and lower guide wheels or rollers 68, 68', the belts being provided with elevator ribs at intervals therein and being drivingly connected with the shafts 59', as by means of chains 69, which drivingly connect the elevator belt carrying and driving rolls 68.

The upper or discharge ends of the elevators 67, 67' may be arranged to deliver ears of corn into downwardly inclined guide chutes 70, 70', which discharge preferably into a common hopper 71, whence the harvested ears may be delivered from the harvesting apparatus in any suitable or preferred fashion, as by means of an elevator 72 adapted to continuously deliver ears from the hopper and discharge the same into a wagon towingly connected with the harvesting apparatus, said elevator 72 preferably being of structure similar to the elevators 67, 67' and being drivingly connected with the power takeoff shaft 48, either directly or through one or other of the countershafts 49, 49'.

It will be noted that the helical pitch of the elements 37, shown in Fig. 3, is substantially greater than the pitch of the elements 37 shown in Fig. 4. While the present invention is not necessarily limited to any specific spiral pitch dimension, the pitch of the elements 37 shown in Fig. 3 may be of the order of 5 inches, while that of the elements shown in Fig. 4 may be of the order of 2½ inches. The spiral pitch dimensions of the elements 37 shown in Figs. 3 and 4 may be slightly altered by adjusting the compression and expansion jacks J shown at the upper and rearward ends of the mounting members 38. It will be seen, also that the apparatus may be constructed to facilitate the ready removal and replacement of the members 34 and 34' so that the equipment, at will and to suit the preference of the operator of the device, or to meet the exigencies of a particular harvesting operation, may be provided either with the coarse pitch elements shown in Fig. 3, or the relatively finer pitch elements shown in Fig. 4.

The driving mechanism, also, is arranged to cause rotation of the members 34 and 34' at an exact speed related to the rate of movement of the equipment along the rows of corn being picked, when the apparatus is in operation for corn picking purposes. Where helical members having a pitch of the order of 5 inches are employed, the driving mechanism is arranged to produce of the order of six or seven revolutions of the members per second. Where the spiral pitch of the members 34 and 34' is of the order of 2½ inches, the driving mechanism should be arranged to produce of the order of nine or ten revolutions per second. In this connection, it will be understood that the speed of operation of the power takeoff shaft is substantially constant while the apparatus is in operation, change in ground speed being accomplished by operation of the variable speed transmission gears of the tractor 23 without material alteration in the speed of the tractor motor.

The required driving speeds for coarse and fine pitch members 34 and 34' may be accomplished by substituting driving sprockets of appropriate dimension at the power input sides of the driving gear units 46. The resulting performance where coarse and fine pitch members are employed is illustrated diagrammatically in Figs. 19 and 20, respectively, for various assumed ground speeds of the mechanism. In this connection, Figs. 19 and 20 illustrate corn stalks carrying ears thereon at various elevations above ground level, the stalks being illustrated in the positions occupied thereby at the instant of ear removal therefrom by operation of the harvesting mechanism. In both figures the stalk A carries an ear to be picked at an elevation of the order of 40 inches above ground level, the same being shown in picking position when the harvesting apparatus is in operation at a ground speed of 2½ miles per hour. Stalk B carries an ear to be picked at an elevation thereon of the order of 46 inches above ground level, the same being shown in picking position when the harvesting apparatus is in operation at a ground speed of 5 miles per hour. Stalk C carries an ear to be picked at an elevation thereon of the order of 70 inches above ground level, the same being shown in picking position when the harvesting apparatus is in operation at a ground speed of 2½ miles per hour. Stalk D carries an ear to be picked at an elevation thereon of the order of 70 inches above ground level, the same being shown in picking position when the harvesting apparatus is in operation at a ground speed of 5 miles per hour.

Comparison of the relative positions of the stalks A and B, and of the stalks C and D, will show that operation of the members 34 and 34' advances stalks in the picking zone at a uniform rate of speed and that, consequently, stalks carrying ears at a particular elevation above ground level will advance in the picking zone, before reaching picking position, further when the harvesting apparatus is traveling at low speed than when the same is traveling at a relatively higher speed. Nevertheless, all of the stalks, regardless of the elevation at which the ears are carried thereon, and regardless of the ground speed of the harvesting equipment, will reach picking position within the limited extent of the picking zone and consequently be harvested.

In order to accommodate corn stalks on which the ears to be harvested are carried at unusually high elevation above ground level, the apparatus includes a stalk guide 73 for each of the picking units. These guides preferably comprise curved shoes of substantial width disposed in alinement with each of the picking units 27, 27', 28 and 28', said shoes being located behind and in substantially horizontal alinement with the lower or leading ends of the picking members 34 and 34', and beneath and slightly behind the upper or trailing ends of said members.

As shown more especially in Figs. 2, 19 and 20, the stalk guides 73 may be located vertically beneath the geared driving mechanisms 45 and 45' of the several units. These guides are preferably carried on mounting shafts 74 supported in the frame structure 22, the guides 73 being turnably adjustable on the mounting shafts. The guides are thus disposed in position to engage and press upon the lower portions of the corn stalks, so as to draw corn stalks downwardly and rearwardly between the members 34 and 34' as when the stalks traverse the uppermost portions of the picking zone. Accordingly, if an ear of corn, carried on its stalk at a substantial elevation above ground level, shall not have reached picking position when the stalk has traversed the forward portions of the picking zone, the operation of the stalk guide will rapidly draw the stalk and the ear carried thereon into picking position, thereby assuring that all ears, regardless of the elevation at which carried on the corn stalks, will reach picking position within the limited extent of the picking zone.

It will be seen from the foregoing that the picking operation is accomplished as the result of passing the ear carrying portions of the corn stalks downwardly between the rotating helical members 34 and 34'. This downward movement of the corn stalks with respect to the members 34 and 34' is caused by the forward movement of the harvesting apparatus, in which the helical members are disposed at an inclination of the order of 45° or less, by adjustment. The removal of the ears, however, is accomplished by the bumping action of the helical elements 37 which, when the ears reach picking position, as the result of forward movement of the harvesting apparatus, operate to knock the ears from the ear carrying stalks, whereupon the ears may drop over the inclined walls 55, 55' and thus be delivered to the receiving zone.

Figure 14:
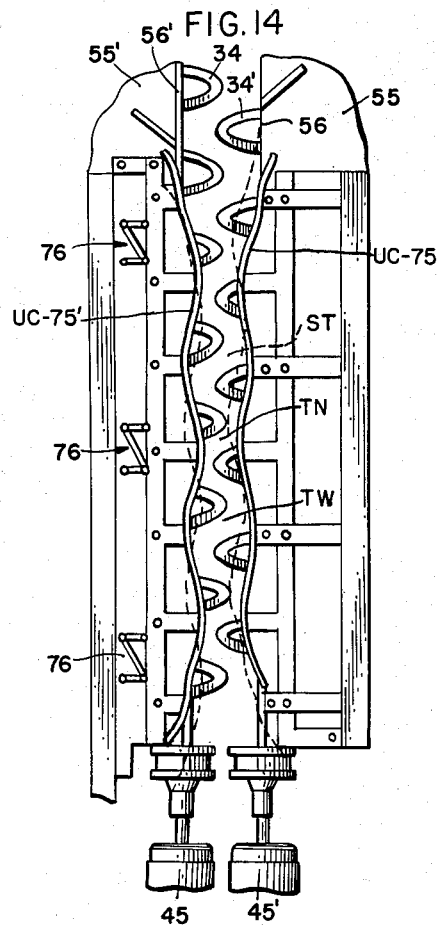
Fig. 14 is a view, similar to Fig. 13, showing a modified construction.

As an aid in the picking operation, the present invention contemplates the optional provision of additional or auxiliary structures and mechanisms adapted to assure the harvesting of ears by removal thereof from the supporting corn stalks in most efficient and expeditious fashion. To this end, as shown more particularly in Figs. 13–16, the wall members 55, 55' of each unit may be provided with throat forming means for altering the size and shape of the elongated opening between the edges 56, 56' which define the picking zone. The throat forming means may comprise a pair of preferably straight spring steel bars SB-75, SB-75' mounted, respectively, on the wall members 55 and 55', in position defining a throat between the facing edges of the wall members. The opposite sides of this throat, as shown more especially in Fig. 13, may be straight and parallel, and adjustable means 76 may be provided for altering the spacement of the bars SB-75 and SB-75' in order to determine the width of the throat. As shown more particularly in Figs. 14 and 16, the members SB-75 and SB-75' may be replaced with bars UC-75, UC-75', of undulating configuration, whereby the throat may comprise successive narrow or restricted and relatively wider throat portions TN and TW, as shown in solid lines in Fig. 14; and means may be provided for supporting throat defining bars TD-75, TD-75' of undulating configuration and disposed in parallel spaced relation to provide a throat of serpentine configuration ST, as indicated in dotted lines in Fig. 14 and as shown in Fig. 16.

Figure 12:
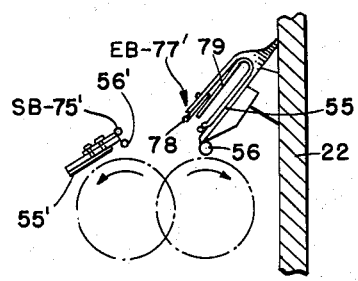
Fig. 12 is an enlarged sectional view taken substantially along the line 12—12 in Fig. 1.

As shown in Fig. 12, a spring actuated ear bumper EB-77 may be mounted on the inclined wall 55 adjacent and along the edge thereof, said bumper comprising a rod or bar 78 resiliently mounted upon the inclined wall 55, as by means of a flexible spring 79 which serves to hold the bar 78 in position in the throat opening to be engaged by ears of corn as the same are drawn to picking position between the ears, said bumper being adapted to engage the ears on one side as the same reach picking position, and hence resiliently toss or bump the same toward the facing edge 56' of the inclined wall member 55', thereby aiding in the picking operation.

Figure 17:
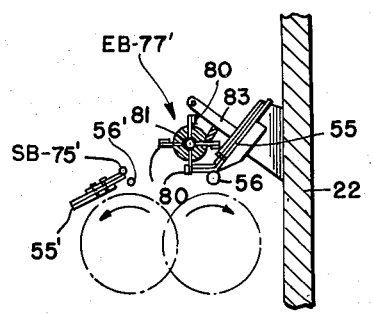
Fig. 17 is an enlarged sectional view, like Fig. 12, taken along the line 12—12 in Fig. 1, to a modified bumper mechanism which may be incorporated in the harvester apparatus.
Figure 18:
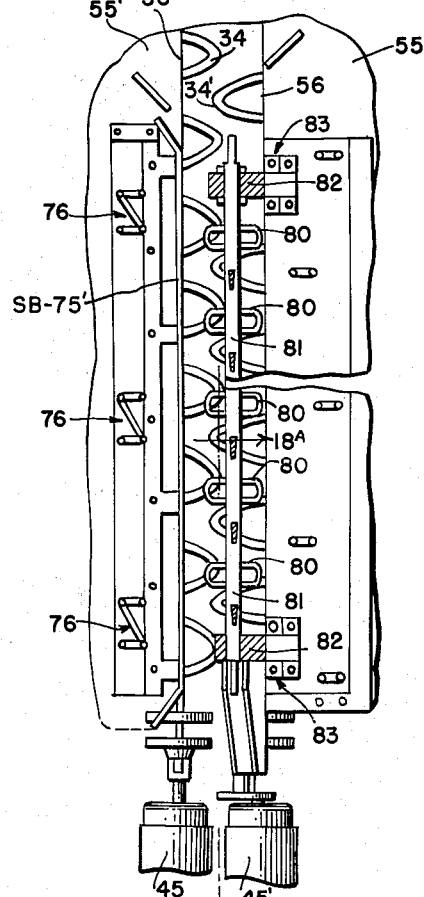
Fig. 18 is a top view of the apparatus shown in Fig 17.

A modified form of ear bumper mechanism EB-77' is illustrated in Figs. 17, 18 and 18A. This bumper mechanism comprises a plurality of blades or loops 80 mounted on and extending radially of a shaft 81 journalled at its opposite ends in bearings 82, which may be supported on suitable pedestals 83 mounted on the inclined wall member 55 in position to support the shaft for turning movement adjacent the picking throat defined between the edges 56 and 56' of the inclined walls. Means may be provided for driving the shaft 81, as by means of a chain 84, from the power delivery shaft of one of the geared driving mechanisms 45 or 45', as shown more particularly in Fig. 18A. Accordingly, when the picker unit, comprising the members 34 and 34', is in operation, rotation of the shaft 81 in a clockwise direction, viewing Fig. 17, will cause the bumper blades or loops 80 to strike upon one side of ears of corn as the same are drawn to picking position between the members 34 and 34', thereby throwing the ears toward the edge 56' of the inclined wall 55', thus aiding in the removal of ears from the carrying stalks and delivering detached ears downwardly across the wall 55' to the ear receiving zone.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of The invention is hereby claimed as follows:

1. In a corn harvester, the combination of a carrying frame and a pair of cooperating picking rolls in parallel spaced relation for receiving ear carrying corn stalks therebetween, said rolls comprising each a shaft turnably supported on the frame and a helical element forming a coil coaxially encircling the shaft and mounted thereon in position disposed outwardly of the shaft, the coils comprising said helical elements having minimum diameter at one end for receiving corn stalks therebetween, the diameter of the coils progressively increasing to a maximum inwardly of said ends to form a stalk receiving zone, and said coils having uniform diameter to form a corn picking zone inwardly of said receiving zone.

2. In a corn harvester, the combination of a carrying frame and a pair of cooperating picking rolls in parallel spaced relation for receiving ear carrying corn stalks therebetween, said rolls comprising each a shaft turnably supported on the frame and a helical element forming a coil coaxially encircling the shaft and mounted thereon in position disposed outwardly of the shaft, the coils comprising said helical elements having minimum diameter at one end for receiving corn stalks therebetween, the diameter of the coils progressively increasing to a maximum inwardly of said ends to form a stalk receiving zone, and said coils having uniform diameter to form a corn picking zone inwardly of said receiving zone, the helical pitch of said coils being substantially greater in said receiving zone than in the picking zone.

3. In a corn harvester, the combination of a carrying frame and a pair of cooperating picking rolls in parallel spaced relation for receiving ear carrying corn stalks therebetween, said rolls comprisng each a shaft turnably supported on the frame and a helical element forming a coil coaxially encircling the shaft and mounted thereon in position disposed outwardly of the shaft, said coils comprising distorted turns forming projecting corners or elbows at intervals therein.

4. In a corn harvester, the combination of a carrying frame and a pair of cooperating picking rolls in parallel spaced relation for receiving ear carrying corn stalks therebetween, said rolls comprising each a shaft turnably supported on the frame and a helical element forming a coil coaxially encircling the shaft and mounted thereon in position disposed outwardly of the shaft, said coils comprising distorted turns forming projecting corners or elbows at intervals therein and outwardly bowed portions intermediate said elbows.

5. In a corn harvester, the combination of a carrying frame and a pair of cooperating picking rolls in parallel spaced relation for receiving ear carrying corn stalks therebetween, said rolls comprising each a shaft turnably supported on the frame and a helical element forming a coil coaxially encircling the shaft and mounted thereon in position disposed outwardly of the shaft, said coils comprising distorted turns forming projecting corners or elbows at intervals therein and reversely curved portions forming cyma bends intermediate said elbows.

6. In a corn harvester, the combination of a carrying frame and a pair of cooperating picking rolls in parallel spaced relation for receiving ear carrying corn stalks therebetween, said rolls comprising each a shaft turnably supported on the frame and a helical element forming a coil coaxially encircling the shaft and mounted thereon in position disposed outwardly of the shaft, said coils comprising distorted turns forming projecting corners or elbows at intervals therein, and means forming projecting lobes in spaced apart relation along said coil forming elements.

7. In a corn harvester, the combination of a carrying frame and a pair of cooperating picking rolls in parallel spaced relation for receiving ear carrying corn stalks therebetween, said rolls comprising each a shaft turnably supported on the frame and a helical element forming a coil coaxially encircling the shaft and mounted thereon in position disposed outwardly of the shaft, said coils comprising distorted turns forming projecting corners or elbows at intervals therein, and outstanding lobe forming fins disposed at spaced intervals along said coil forming elements.

8. In a corn harvester comprising a carrying frame, a pair of cooperating picking rolls forming helically configurated means for receiving ear carrying corn stalks therebetween, said rolls being turnably mounted on said frame in position inclined upwardly and rearwardly from the forward stalk receiving ends of said rolls toward a limited ear picking zone provided at the rearward ends thereof, means to turn said rolls to travel the corn stalks axially thereof at a regulated rate of speed, and means to travel the carrying frame at selected ground speed whereby corn stalks carrying ears thereon at unlike elevations may be drawn downwardly between said rolls to present stalk carried ears in picking position against said helically configurated means in said picking zone, the combination with said picking rolls of stalk drawing means comprising a shoe carried on said frame in position disposed beneath and behind said rolls to laterally engage corn stalks adjacent the ground attached ends thereof and to ride along said stalks in order to draw the same downwardly between the rolls at a relatively rapid rate as the same approach the trailing end portions of said picking zone.

References Cited in the file of this patent

UNITED STATES PATENTS

| Number | Name | Date |
|---|---|---|
| 309,462 | Hopper | Dec. 16, 1884 |
| 353,384 | Snow | Nov. 30, 1886 |
| 882,734 | Ball | Mar. 24, 1908 |
| 1,049,400 | Rollins et al. | Jan. 7, 1913 |
| 1,049,401 | Rollins et al. | Jan. 7, 1913 |
| 1,665,404 | Crabill | Apr. 10, 1928 |
| 1,717,305 | Beckman | June 11, 1929 |
| 2,288,915 | Morral et al. | July 7, 1942 |
| 2,351,807 | Court | June 20, 1944 |
| 2,542,646 | Fergason | Feb. 20, 1951 |